United States Patent [19]

Neuendorf et al.

[11] Patent Number: 5,088,672
[45] Date of Patent: Feb. 18, 1992

[54] CIRCUMSCRIBING SIGN CLAMP AND METHOD OF FABRICATION

[76] Inventors: Paul A. Neuendorf, 7 Boyd St., Doncaster, Victoria, Australia, 3108; John A. Petrie, 5 Carters Lane, Seville, Australia, 3139

[21] Appl. No.: 636,748

[22] Filed: Jan. 2, 1991

[51] Int. Cl.⁵ ............................................. F16B 9/00
[52] U.S. Cl. ................................. 248/230; 248/74.4; 248/218.4; 403/386
[58] Field of Search .................... 248/74.4, 230, 218.4, 248/219.4; 403/385, 386, 398, 400

[56] References Cited

U.S. PATENT DOCUMENTS

| | | | |
|---|---|---|---|
| 1,088,324 | 2/1914 | Corkhill | 248/218.4 |
| 1,770,564 | 7/1930 | Zahonyi | 248/230 |
| 3,069,189 | 12/1962 | Hollaender | 403/385 |
| 3,126,100 | 3/1964 | Christensen | 248/230 X |
| 3,503,580 | 3/1970 | Levy | 248/219.4 X |
| 3,787,015 | 1/1974 | Ablett | 248/230 X |
| 4,493,468 | 1/1985 | Roach | 248/74.4 X |
| 4,852,840 | 8/1989 | Marks | 248/230 |

FOREIGN PATENT DOCUMENTS

| | | | |
|---|---|---|---|
| 688885 | 6/1964 | Canada | 248/74.4 |
| 429668 | 6/1935 | United Kingdom | 403/385 |
| 682633 | 11/1952 | United Kingdom | 248/74.4 |

Primary Examiner—David L. Talbott
Attorney, Agent, or Firm—Thorpe, North & Western

[57] ABSTRACT

A circumscribing clamp useful for attaching a sign to a post or other support structure and permitting circumferential positioning of the clamp there around. The clamp comprises a first clamp member having a central base section positioned in the first plane of reference and first and second wing sections extending therefrom. A second clamp member of similar construction is provided having a central base and first and second wing sections with first and second distal ends. The first distal ends of each respective clamp include interlock structure which engages with interlock structure of the second distal ends along a directional orientation which is approximately perpendicular with respect to the plane of reference identified for the first clamp member. The respective clamp members are stabilized in interlocking engagement by application of counter forces imposed by a displacement screw which operates to urge one clamp member away from the other by pushing with respect to the contained post, thereby securing the clamps with respect to the post.

12 Claims, 2 Drawing Sheets

CIRCUMSCRIBING SIGN CLAMP AND METHOD OF FABRICATION

BACKGROUND OF THE INVENTION

1. Field of Invention

This invention relates to clamping devices for attaching a sign or other display means to a post or other upright support. More specifically, the present invention relates to sign clamps which have converging halves which cooperate to surround a support post and clamp the sign thereto by fixation of the sign to one of the clamp members.

2. Prior Art

A variety of devices and methods have been developed over the past years for attaching a sign or display means to an upright post or sign support. Where the sign support is a free standing structure such as a post, tube, channel or other upright support structure which supports circumferential attachment of a clamp around the post, numerous devices have been developed. For example, a circular clamp which attaches at its periphery to the sign and is bolted directly to the sign post or support structure is well known. Typically, such mounting configurations involve drilling a hole through the support post or otherwise securing the screw or bolt within the post structure. Although such a technique is suitable in some instances, concrete posts or other support structures which are very difficult to penetrate poses a difficult challenge. Furthermore, where signs are changed periodically, new holes must be drilled, thereby weakening the sign support or defacing its appearance.

Other circumscribing attachment devices have been developed which represent a pair of circular clamps, open at one side and including projecting flange members which enable joining at the flanges by a bolt and nut. Typically, the inner diameter of the clamp is less than the outer diameter of the post. In such instances, the forces retaining the attachment device at the sign post are tangential forces along the post exterior which are applied by tightening the respective flanges into close contact, thereby squeezing the sign post within the shortened diameter. This necessitates appropriate sizing of the clamp to properly grasp the sign post at internal faces of the clamp structure.

Such a configuration involves application of direct forces applied by pulling the two clamp halves into close relationship. Naturally, application of such direct forces require the use of bolts or other structure which restrains the clamp halves bidirectionally, both toward the joining faces of the clamps, as well as at opposing orientations directed away from the clamp faces. Such clamping structures are typically more cumbersome to install and detach and are frequently subject to deformation around the post by virtue of the forces applied at each side of the clamp. Furthermore, the use of bolts on opposite sides of the clamp requires some balancing of force between the opposing bolts. This balancing must be accomplished by placing the approximate same number of turns with respect to each bolt, thereby maintaining an approximate common separation distance between the opposing clamp members.

These complications characterize the typical problems associated with clamping structures for signs. These problems generally involve difficulty of attachment, labor intensive procedures for attachment to the post and fabrication procedures which tend to be costly where several components make up a single clamp structure. What is needed is a general clamp configuration which reduces fabrication cost and labor and provides simple installation technique which is versatile with respect to any sign post requiring circumferential attachment of the sign and the attached clamp structure.

OBJECTS AND SUMMARY OF THE INVENTION

Accordingly, it is an object of the present invention to provide a circumscribing clamp which can be quickly and easily coupled to a sign and attached to a support post in a configuration which is readily detachable and vertically adjustable along the height of the support post.

Another object of the present invention is to provide a clamp structure which may be applied to any support post which is of lesser diameter than the clamp interior, yet which does not require conformance of the interior clamp surface with the exterior surface of the support post.

It is a further object of the present invention to provide a sign clamp which is easily manufactured and requires minimal storage space in its unassembled configuration.

These and other objects are realized in a circumscribing clamp useful for attaching a sign or other structure to a post wherein the clamp includes a first clamp member having a central base section positioned in a first plane of reference and first and second wing sections respectively attached at opposing sides of the base section and extending forward from the base section with a directional component along a second plane of reference which is orthogonal with respect to the first plane. A second clamp member includes a central base section positioned in a third plane of reference which is parallel with the first plane of reference and which includes first and second wing sections respectively attached to the opposing sides of the base section which extend forward from the base section with a directional component along the second plane of reference. Each set of first and second wing sections for each clamp includes first and second distal ends. The first distal end includes first interlock means and the second distal end includes second interlock means, which first and second interlock means are configured for interlocking engagement along a directional orientation parallel with the second plane. Means are provided for applying a counter force which stabilizes the interlocking engagement between the respective first and second interlock means in a rigid, attachment configuration. Also disclosed is a method for fabricating such clamps, including the steps of manufacturing a single length of extruded material and fabricating both the first and second clamp members from the same length of extruded material.

Other objects and features of the invention will be apparent to those skilled in the art in view of the following detailed description, in combination with the accompanying drawings.

DESCRIPTION OF PREFERRED EMBODIMENT

Figure 1:
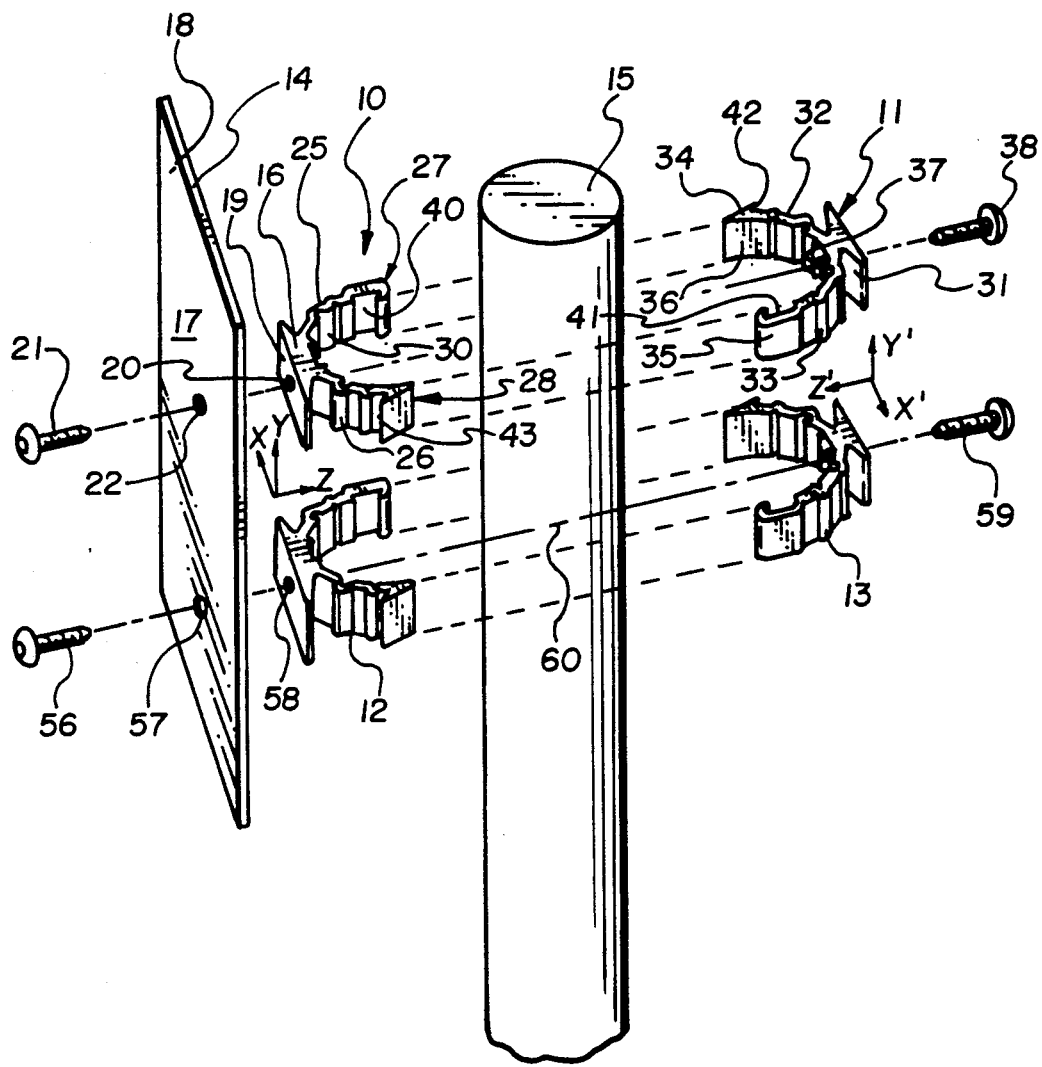
FIG. 1 depicts an exploded perspective view utilizing a pair of attachment clamps which are to be secured to a support post.

Referring now to the drawings:

A separated view of the sign clamps constructed in accordance with the present invention is illustrated as items 10, 11, 12 and 13. These clamps comprise circumscribing structure for attaching a sign 14 or other similar structure to a post 15 or other type of support structure. These clamps comprise two pairs of clamp members 10 and 11, 12 and 13 which respectively interlock in a circumferential position around post 15 as is described in greater detail hereafter.

In the preferred embodiment, each clamp member 10, 11, 12 and 13 are of exactly the same configuration, yet are able to interconnect in the described circumferential position to conveniently and securely attach the desired sign 14 at the support structure 15. Although the drawings illustrate clamp members having identical configuration, it will be apparent to those skilled in the art that the broader aspect of the present invention can be practiced with different types of clamp members which cooperate in a manner which is set forth in the following paragraphs.

Accordingly, the initial description sets forth a construction wherein the clamp members are not identical in configuration but are described instead as first and second clamp members. In FIG. 1, a first clamp member 10 is identified and includes a central base section 16 which is positioned in a first plane of reference X-Y. Typically, this plane will be parallel with the face 17 of sign 14. This central base section 16 operates as a mounting support wherein the backside 18 of the sign 14 abuts against a contacting face 19 of the central base section. For this reason, the contact face 19 is of flat configuration to thereby stabilize sign 14 to be somewhat rigid within the plane X-Y or parallel therewith.

The central base section 16 further includes a threaded opening 20 which extends all the way through the base section to allow passage of a screw 21. This configuration is more clearly illustrated in FIG. 3, which shows the sign 14 with the screw 21 which extends through a sign opening 22 and into the threaded opening 20 of the central base section. In this manner, screw 21 is journalled in threaded opening 20 and operates to stabilize the sign by imposing abutting contact between faces 18 and 19. It will be apparent that other configurations will be adapted for the central base section ti implement its primary purposes of providing a mounting location for the sign 14 to the first clamp member 10.

Projecting forward from the central base section are first 25 and second 26 wing sections, which are respectively attached at opposing sides of the base section 16. These wing sections 25 and 26 project forward with a directional component extending along a second plane X-Z which is orthogonal with respect to the first plane X-Y. Although the illustrated embodiment is shown with the respective wing sections 25 and 26 being contained or parallel with the second plane X-Z, it will be apparent to those skilled in the art that these respective wings could be inclined with respect to this plane, as long as the inclination includes a directional component which extends along or parallel with this X-Z plane.

These respective first and second wing sections include respective first 27 and second 28 distal ends. Extending between these distal ends 27 and 28 is an intermediate, internal face 30 which faces toward the exterior surface of sign post 15 being circumscribed by the clamps.

The second clamp member 11 has a similar construction including a central base section 31 which is positioned in a third plane of reference X'-Y' and first 32 and second 33 wing sections respectively attached at opposing sides of the base section which extend forward with a directional component along a second plane of reference X'-Z' which is orthogonal with respect to the first and third planes of reference. These wing sections 32 and 33 also include first 34 and second 35 distal ends and an intermediate, internal face 36 there between. The components of the second clamp member operate in a manner similar to the components indicated with respect to the first clamp member. Also included is a central opening 37 which is threaded and receives a screw 38. This second screw 38 operates to impose counter forces between the first and second clamp members which cooperate to securely attach the coupled sign 14 to the upright post 15. This mechanism is discussed hereafter.

The described engagement of the first and second clamp members 10 and with respect to the post 15 is accomplished by interlock means configured at each of the distal ends 27, 28, 34 and 35 of the respective clamps. The first distal ends 27 and 35 include a first interlock means 40 and 41 which is configured to interlock and engage with second interlock means 42 and 43 in a manner similar to that illustrated in FIG. 3. This interlocking engagement occurs along a directional orientation which is parallel with a second plane of reference X'-Z'.

The specific interlock means structure illustrated in the drawings includes a tongue-in-groove mechanism which is stabilized by counter forces applied between a tongue element 44 of the second distal end 28 with a groove element 45 of the first distal end 27. This groove 45 comprises a channel formed at an internal face of the first distal end, which channel is approximately parallel in orientation with respect to the first plane of reference X-Y. This channel includes a first engagement face 46 which is orientated toward the attached central base section 47 and which is configured at its most distal end in the internal face to include a v-shaped groove 48 wherein the first engagement face 44 comprises one side of the v-shaped groove, said v-shaped groove having its open end oriented toward the base section 47 attached to its wing section 32.

The tongue section 44 of the second distal end is configured with an external face which fits within the groove 34 of the first distal end. This external face 49 includes a v-shaped wedge 50 formed at its more proximate side with respect to the attached wing and base sections and is configured to seat within the v-shaped groove 48 of the first distal end. This v-shaped wedge 50 includes a second engagement face 51 which is oriented toward its attached base section 15.

In this manner, the first and second interlock means are configured for a unique counter-directional engagement wherein the interlocking engagement occurs only along a single direction of contact between the v-shaped wedge and v-shaped groove as previously described. This directed contact corresponds to the direction of applied counter forces which are generated by use of screw 38.

Generally speaking, these counter forces may be imposed by any means coupled to one or both of the respective central bases 16 and 47 of the first and second clamp members, provided the coupled means develops a set of opposing counter forces $F_1$ and $F_2$ which are translated into abutting forces against the respective first and second engagement faces 46 and 51 of the respective interlock means. These forces operate to stabilize the required interlocking engagement and maintain the clamp members in their desired positions. These respective counter forces $F_1$ and $F_2$ are oriented along the referenced direction of contact 52, meaning the direction of contact between the first 46 and second 51 engagement faces. It will be apparent that the degree of force applied will depend upon the extent to which screw 38 (in combination with screw 21) is introduced within the enclosed area 53 and into contact 54 and 55 with the post 15.

Figure 3:
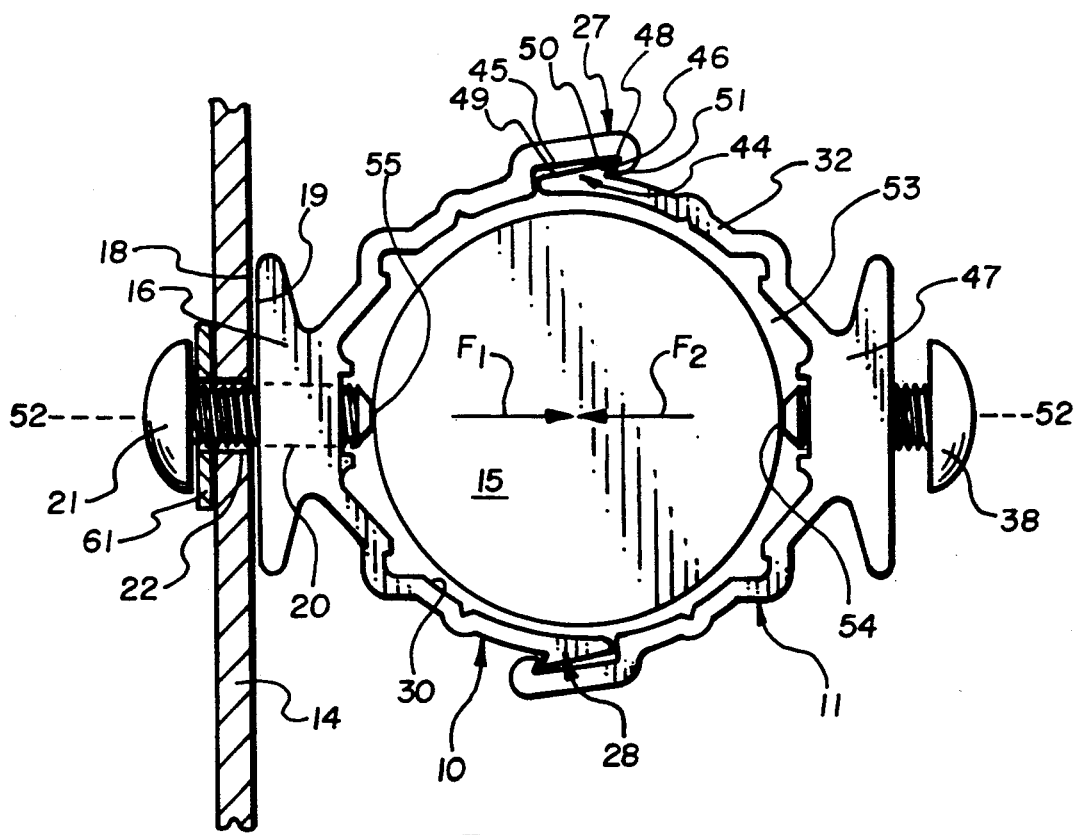
FIG. 3 illustrates the attached configuration of a preferred embodiment of the present invention, with a sign and circumscribed sign post.

A disclosed preferred embodiment includes several additional features of configuration which are of interest. The geometric cross section as shown in FIG. 3 defines a circular opening 53 which is formed by reason of the respective first and second arcuate clamp members 10 and 11. It would be apparent that optional configurations could be developed, depending upon the configuration of the sign post 15 to which the pair of clamps was to be secured. For example, if post 15 were rectangular or square shaped, a rectangular clamp member could be used instead of the arcuate shape identified in the present disclosure.

FIG. 1 shows the expected application of the present invention in combination with a second pair of clamp members 12 and 13. The configuration and the utility of clamp 12 corresponds to the same description supplied previously with respect to clamp 10. Similarly, clamp member 13 corresponds to clamp member 11 in configuration and operation. The additional clamp members 12 and 13 are secured to post 15 at a second elevation by means of a displacement screw 56 which corresponds to screw 21. This screw is directed through a sign opening 57 and into a threaded opening 58 within the clamp member 12. As with the previous disclosure, a second screw 59 may be applied from the opposite direction to establish the referenced direction of contact or directional orientation 60 which corresponds to the application of counter forces $F_1$ and $F_2$ as described with respect to clamp members 10 and 11.

The engaged pairs of clamp members 10 and 11, 12 and 13 securely orient the attached sign 14 in place with respect to the post 15. Secure engagement is accomplished as illustrated in FIG. 3. Release is realized by merely rotating displacement screws 38 and 59 to loose tension between contact faces 46 and 51. As soon as the counter forces are released (which requires very little rotation of the respective displacement screws 38 and 59), the second clamp members are released and fall free from the sign post 15. A spacer element 61 may be added at either screw on opposing sides of the direction of force 52 to facilitate sign emplacement as well as post diameter.

A typical method of installation of the sign 14 to a post 15 utilizing the present invention would be in accordance with the following steps. A first clamp member 10 would be attached to the sign 14 utilizing a screw 21. If the screw extends too far into the interior 53 of the pair of clamps, a spacer 61 may be applied to reduce the degree of penetration of the screw within this enclosed area 53. The second clamp member 12 is similarly attached to the sign 14. The sign with attached clamp members 10 and 12 is then nested on the post with approximately one-half of the post seated within the arcuate area between first and second wing sections 25 and 26. Alternatively, mounting bolts can be inserted through opening 20, with a nut being placed on the bolt to secure the sign in place. In this case a single screw 38 would be used to generate the opposing forces.

The second clamp member 11 is then similarly oriented slightly above or below the distal ends 27 and 28 of the first clamp member, with the respective interlocking means 40 and 42 in approximate vertical alignment. In this configuration, the tongue element 44 easily slides into the groove element 45, where slight rotation of the displacement screw 38 engages the post 15 at contact point 54. The sign is then secured. The second clamp member 13 is similarly attached to the first clamp member 12, completing installation.

Figure 2:
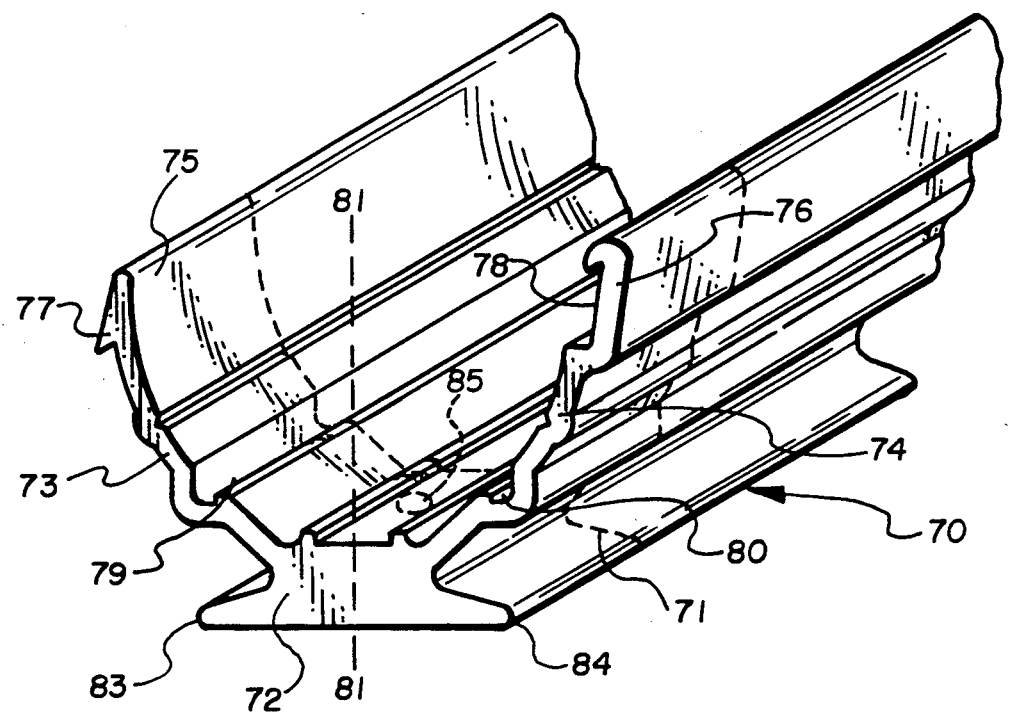
FIG. 2 illustrates a single length of extruded material which may be used to form both clamp members making up a single clamp structure in accordance with the present invention.

In addition to the improved convenience and simplicity of the disclosed sign clamp, the present invention enables clamp construction from a single extruded piece of clamp material. Such an extruded piece is illustrated in FIG. 2 generally as item 70. This extruded piece of material can be of continuous length greatly reducing the cost of manufacture by fabricating in accordance with well known techniques of extrusion, including conventional pultrusion methods which enable the use of plastics having fiber reinforcement for additional strength. Similarly, extrusion of aluminum enables the fabrication of the sign cross section in a sturdy, metallic construction.

Fabrication of clamp elements is accomplished by merely cutting sections of the continuous extruded material as indicated at broken line 71. It will be apparent that such a technique can be developed as part of an assembly line operation where the extruded material is rapidly cut in segments after it passes through a forming guide which provides the desired configuration in cross section.

The illustrated configuration of the extruded material in FIG. 2 is the same as clamp construction previously described and shown in FIGS. 1 and 3. This configuration includes the central section 72 and projecting wing sections 73 and 74. Distal ends 75 and 76 include the tongue 77 and groove 78 combination previously discussed. Additional interior grooves 79 and 80 are formed within the cross section to facilitate stacking of multiple extruded members along a common vertical axis. These grooves 79 and 80 receive the distal edges 83 and 84 of the central base section 72. This configuration not only facilitates stacking and storage in a reduced space, but also enables the formation of the threaded opening 85 by drilling and tapping a multiple set of extruded members with a single pass. These notches 79 and 80 also allow expansion of the radius of the clamp without over stressing the aluminum structure. The clamp wings simply bend out at these dimple formations.

The present invention provides a significant step forward in the state of the art of sign attachment structure by reason of the enhanced convenience of attachment and the improved efficiency of manufacture. These combined benefits are realized by a single extruded section such as is illustrated in FIG. 2, supplying both sides of the clamp (clamp members 10 and 11) with a single cross section which is interchangeable.

It will be understood by those skilled in the art that the foregoing description of embodiments is merely exemplary. Accordingly, the scope of invention is not to be limited by the detailed description provided herein, but only in accordance with the following claims.

I claim:

1. A circumscribing clamp useful for attaching a sign or other structure to a post or other support structure permitting circumferential positioning of the clamp there around, said clamp comprising:
   (1.1) a first clamp member having a central base section positioned in a first plane of reference and first and second wing sections respectively attached at opposing sides of the base section and extending forward from the base section with a directional component along a second plane of reference which is orthogonal with respect to the first plane, said wing sections having corresponding first and second distal ends and an intermediate, internal face therebetween;
   (1.2) a second clamp member having a central base section positioned in a third plane of reference which is parallel with the first plane of reference and first and second wing sections respectively attached at opposing sides of the base section and extending forward from the base section with a directional component along a second plane of reference which is orthogonal with respect to the first plane and third planes, said wing sections having corresponding first and second distal ends and an intermediate, internal face therebetween;
   (1.3) said first distal ends including first interlock means and said second distal ends including second interlock means, said first and second interlock means being configured for unidirectional interlocking engagement along a single engagement orientation parallel with the second plane, which interlocking engagement is stabilized by imposition of opposing counter forces along the single engagement orientation and between the respective interlock means; and
   (1.4) counter force imposing means coupled to at least one of the respective bases of the first and second clamp members and being operable to generate the opposing counter forces along the engagement orientation for stabilizing the interlocking engagement of the first and second clamp members.

2. A device as defined in claim 1, wherein the first and second clamps have identical configurations.

3. A device as defined in claim 2, wherein the respective first and second clamp members are formed by cutting each clamp from a common piece of extruded material having a uniform cross section corresponding to the desired clamp cross section.

4. A device as defined in claim 2, wherein the interlock means of the first and second distal ends comprise a tongue-in-groove interlock mechanism which is stabilized by counter forces applied by a tongue element of the interlock mechanism against a groove element thereof.

5. A device as defined in claim 4, wherein the interlock means of the first distal end comprises a groove formed at an internal face of the first distal end which is parallel in groove orientation with respect to the first plane and which includes a first engagement face oriented toward its attached base section, said interlock means of the second distal end comprising a tongue element configured at an external face of the second distal end to fit within the groove within the internal face of the first distal end and including a second engagement face oriented toward its attached base section.

6. A device as defined in claim 5, wherein a most distal end of the groove in the internal face includes a V-shaped groove wherein the first engagement face comprises one side of the V-shaped groove, said V-shaped groove having its open end oriented toward the base section attached to its wing section;
   said second distal end including a V-shaped wedge formed at its more proximate side with respect to the attached wing and base sections and being configured to seat within the V-shaped groove of the first distal end.

7. A device as defined in claim 1, wherein the first and second wings of the respective first and second clamps project forward in an arcuate configuration such that the respective internal faces between the interlocking distal ends form a circular configuration for the clamp.

8. A device as defined in claim 1, wherein the counter force imposing means comprises a displacement screw journalled within a threaded opening disposed within the base section of the second clamp means in an orientation parallel with the second plane of reference such that rotation of the screw inward displaces a forward end of the screw into contact with the post or other support structure, thereby imposing a counter force upon further inward rotation of the screw.

9. A device as defined in claim 8, wherein the counter force imposing means includes a second displacement screw journalled within a threaded opening disposed within the base section of the first clamp means in an orientation parallel with the second plane of reference such that rotation of the second screw inward displaces a forward end of the screw into contact with the post or other support structure opposite from contact arising from the first screw, thereby imposing a counter force upon further inward rotation of the second screw.

10. A method for manufacturing a circumscribing clamp useful for attaching a sign or other structure to a post or other support structure permitting circumferential positioning of the clamp there around, said method comprising:
   (11.1) preparing a first clamp member having a central base section positioned in a first plane of reference and first and second wing sections respectively attached at opposing sides of the base section and extending forward from the base section with a directional component along a second plane of reference which is orthogonal with respect to the first plane, said wing sections having corresponding first and second distal ends and an intermediate, internal face therebetween;
   (11.2) preparing a second clamp member having a central base section positioned in a third plane of reference which is parallel with the first plane of reference and first and second wing sections respectively attached at opposing sides of the base section and extending forward from the base section with a directional component along the second plane of reference which is orthogonal with respect to the first and third planes, said wing sections having corresponding first and second distal ends and an intermediate, internal face therebetween;
   (11.3) configuring said first distal ends to include first interlock means and said second distal ends to include second interlock means adapted for interlocking engagement along a unidirectional orientation parallel with the second plane;

(11.3) providing means for imposing a counter force to the respective bases of the first and second clamps to generate the opposing counter forces along the directional orientation for stabilizing the interlocking engagement of the first and second clamp members.

11. A method as defined in claim 10, comprising the more specific step of fabricating the first and second clamps from a single length of extruded material such that both the first and second clamp members have identical configurations in cross-section along the second plane of reference.

12. A method as defined in claim 11, wherein the fabricating step includes forming the extruded clamp members from a length of extruded material which is passed through a single die configuration, each clamp member being cut along a plane which is orthogonal to the longitudinal axis of the extruded material from the single length of material as a clamp segment.

* * * * *